US011824403B2

(12) United States Patent
Islam et al.

(10) Patent No.: US 11,824,403 B2
(45) Date of Patent: Nov. 21, 2023

(54) MACHINES UTILIZING HEAVY RARE EARTH FREE PERMANENT MAGNETS

(71) Applicant: North Carolina State University, Raleigh, NC (US)

(72) Inventors: Md. Sariful Islam, Raleigh, NC (US); Iqbal Husain, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 17/221,447

(22) Filed: Apr. 2, 2021

(65) Prior Publication Data

US 2021/0344240 A1 Nov. 4, 2021

Related U.S. Application Data

(60) Provisional application No. 63/004,951, filed on Apr. 3, 2020.

(51) Int. Cl.
   *H02K 1/27* (2022.01)
   *H02K 1/02* (2006.01)
   *H02K 1/276* (2022.01)

(52) U.S. Cl.
   CPC .............. *H02K 1/2766* (2013.01); *H02K 1/02* (2013.01)

(58) Field of Classification Search
   CPC ........ H02K 1/276; H02K 1/2766; H02K 1/02; H02K 1/27; H02K 1/274; H02K 1/279; H02K 15/03; H02K 2213/03; H02K 21/14
   USPC .............. 310/154.21, 154.24, 156.45, 156.56
   See application file for complete search history.

(56) References Cited

U.S. PATENT DOCUMENTS

| 4,942,322 A * | 7/1990 | Raybould | ............... H02K 15/03 29/598 |
| 2010/0109468 A1* | 5/2010 | Natsumeda | ............... H02K 1/02 310/156.43 |
| 2010/0219712 A1* | 9/2010 | Kogure | ................ H02K 1/2766 310/156.43 |
| 2012/0175988 A1* | 7/2012 | Hino | ......................... B60L 7/18 310/156.38 |
| 2013/0241340 A1* | 9/2013 | Koga | .................... H02K 1/2773 310/156.56 |
| 2015/0001970 A1* | 1/2015 | Zhang | ....................... H02K 1/17 310/43 |
| 2015/0001980 A1* | 1/2015 | Zhang | .................... H02K 21/16 310/156.43 |
| 2019/0222076 A1* | 7/2019 | Tangudu | ................ H02K 15/03 |

(Continued)

OTHER PUBLICATIONS

Electrical and electronics technical team roadmap, U.S. Drive, Tech. Rep., Oct. 2017.

(Continued)

*Primary Examiner* — John K Kim
(74) *Attorney, Agent, or Firm* — Thomas | Horstemeyer, LLP

(57) ABSTRACT

Various examples are provided related to machines utilizing heavy rare earth (HRE) free permanent magnets. In one example, a rotor assembly including a rotor core having a plurality of rotor slots and magnets positioned within the plurality of rotor slots. At least a portion of the magnets are free of heavy rare earth (HRE) elements. The magnets can include a combination HRE segments and HRE-free segments or can be free of HRE elements. The rotor assembly can be included in an electric machine such as, e.g., a permanent magnet (PM) machine.

12 Claims, 17 Drawing Sheets

(56) References Cited

U.S. PATENT DOCUMENTS

2019/0280568 A1* 9/2019 Mori .................... B62D 5/0481
2020/0395800 A1* 12/2020 Rong .................... H02K 21/14
2021/0344240 A1* 11/2021 Islam ................... H02K 1/2766

OTHER PUBLICATIONS

Https://product.tdk.com/info/en/catalog/datasheets/magnet neo neorec45mhf en. pdf.
Https://www.amoldmagnetics.com/wp-content/uploads/2018/11/N48UH GBDD 181031.pdf.
Y. Hwang and J. Lee, "Hev motor comparison of ipmsm with nd sintered magnet and heavy rare-earth free injection magnet in the same size," IEEE Transactions on Applied Superconductivity, vol. 28, No. 3, pp. 1-5, Apr. 2018.

* cited by examiner

| | |
|---|---|
| Outer diameter, $OD$ (mm) | 204 |
| Active length (mm), $L_{stk}$ | 61 |
| DC Bus (V) | 350 |
| $I_{max}$ (A) | 564 |
| Torque (Nm) | 161 |
| Speed (r/min) | 6,000 |
| max. speed (r/min) | 18,000 |
| Peak power (kW) | 101 |
| Active volume (Liter) | 2 |
| MW (magnet width) (mm) | 15 |
| MT (magnet thickness) (mm) | 3.8 |
| Magnet volume (kg) | 0.61 |
| Current density (A/mm$^2$) | 28 |

|  | Hybrid | Design-I |
|---|---|---|
| OD (mm) | 204 | 204 |
| $L_{stk}$ (mm) | 61 | 61 |
| Torque (Nm) | 161 | 161 |
| Speed (r/min) | 6,000 | 6,000 |
| MW (mm) | 15 | 15 |
| MT (mm) | 3.8 | 3.8 |
| HRE-free (kg) | 0.60 | 0.61 |
| HRE (kg) | 0.07 | 0.0 |
| Magnet loss (W) | 26 | 71 |

MACHINES UTILIZING HEAVY RARE EARTH FREE PERMANENT MAGNETS

CROSS REFERENCE TO RELATED APPLICATIONS

This application claims priority to, and the benefit of, U.S. provisional application entitled "Machines Utilizing Heavy Rare Earth Free Permanent Magnets" having Ser. No. 63/004,951, filed Apr. 3, 2020, which is hereby incorporated by reference in its entirety.

STATEMENT REGARDING FEDERALLY SPONSORED RESEARCH OR DEVELOPMENT

The present invention was made with United States government support under grant number DE-EE0008705 awarded by the U.S. Department of Energy (DOE). The United States government has certain rights in the invention.

BACKGROUND

Interior permanent magnet (IPM) machines are popular choice for traction applications due to their high-power density and high efficiency. In IPM machines, magnets are buried inside the rotor that enables the utilization of both reaction torque and reluctance torque. To utilize the reluctance torque, a negative d-axis current is applied; which consequently exposes the rare-earth permanent magnet (PM) under the demagnetization field. The d-axis current may push the magnet flux density in the vicinity of knee point flux density.

Magnet temperature increases at higher speed operation due to higher iron loss and can potentially deteriorate to irreversible demagnetization stage. Irreversible demagnetization degrades machine performance; which is not acceptable for safety-critical applications. Hence, PMs are specially designed to withstand the demagnetization field at the maximum allowable operating temperature. However, rare earth permanent magnet comprises heavy rare earth (HRE) contents such as Dysprosium (Dy) and Terbium (Tb) to improve the demagnetization performance of PM machines. These elements are called HRE because of its limited availability or scarce source and high cost.

SUMMARY

Aspects of the present disclosure are related to machines utilizing heavy rare earth (HRE) free permanent magnets. In one aspect, among others, a permanent magnet (PM) machine comprises a rotor assembly comprising a rotor core having a plurality of rotor slots; and a plurality of magnets positioned within the plurality of rotor slots, where at least a portion of individual magnets of the plurality of magnets are free of heavy rare earth (HRE) elements. In one or more aspects, the individual magnets can be segmented. Each of the individual segmented magnets can comprise first and second end portions at opposite ends of the individual segmented magnet and a middle portion separating the end portions, wherein the first end portion includes a first heavy rare earth (HRE) segment, the second end portion includes a second HRE segment, and the middle portion includes at least a first HRE-free segment.

In some aspects, the first end portion can comprise a second HRE-free segment adjacent to the first HRE segment and the first HRE-free segment, and the second end portion can comprise a third HRE-free segment adjacent to the second HRE segment and the first HRE-free segment. The individual segmented magnets can comprise a length defined by the end portions and the middle portion, where a width of the end portions is greater than a width of the middle portion. A side of the first and second HRE segments can be aligned with a side of the first HRE-free segment. In various aspects, each of the plurality of magnets is free of HRE elements. Each of the plurality of magnets can comprise first and second end portions at opposite ends and a middle portion separating the end portions, the first and second end portions and the middle portion defining a length of that magnet, and where a width of the first and second end portions is greater than a width of the middle portion.

Each of the plurality of magnets can comprise first and second end portions at opposite ends and a middle portion separating the end portions, the first and second end portions and the middle portion defining a length of that magnet, and where a width of the first end portion is greater than a width of the middle portion, and the width of the middle portion is greater than a width of the second end portion. Each of the plurality of magnets can comprise at least first and second end portions, a length of that magnet extending between a side of the first end portion opposite the second end portion and a side of the second end portion opposite the first end portion, and where a width of the first end portion is greater than a width of the second end portion. Each of the plurality of magnets can consist of the first and second end portions. The rotor assembly can be positioned within a stator assembly of the PM machine.

In another aspect, a rotor assembly for an electric machine comprises a rotor core having a plurality of rotor slots; and individual magnets positioned within corresponding magnet cavities of the plurality of rotor slots, where at least a portion of the individual magnets are free of heavy rare earth (HRE) elements. In one or more aspects, each of the individual magnets can comprise at least first and second end portions, a length of that magnet extending between a side of the first end portion opposite the second end portion and a side of the second end portion opposite the first end portion. The first end portion can include a first heavy rare earth (HRE) segment and a first HRE-free segment, and the second end portion can include a second HRE segment and a second HRE-free segment. Each of the individual magnets can comprise a middle portion between the first and second end portions, the middle portion comprising a third HRE-free segment. A width of the first and second end portions can be greater than a width of the middle portion.

In various aspects, each of the individual magnets can be free of HRE elements. A width of the first end portion can be greater than a width of the second end portion. Each of the individual magnets can comprise a middle portion. A width of the middle portion can be less than the width of the first end portion and greater than the width of the second end portion. The individual magnets can be offset from an end of the rotor slot cavity by a defined distance.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figures 1A, 1B:
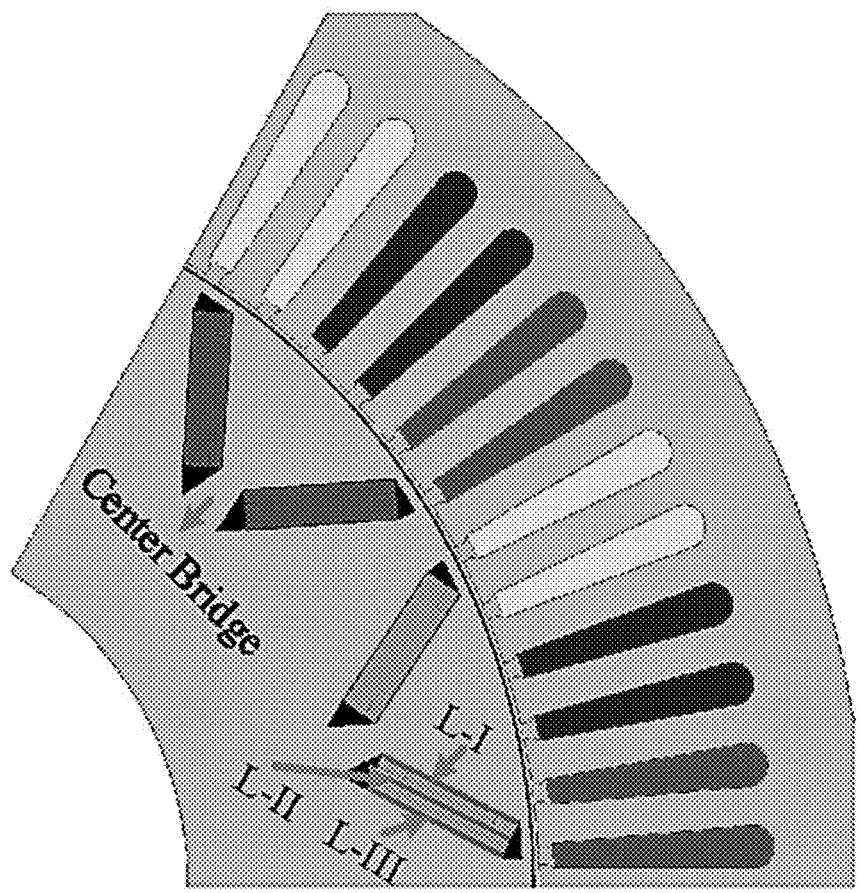
FIGS. 1A and 1B illustrate an example of a finite element analysis (FEA) model and specifications of a regular interior permanent magnet (IPM) machine, in accordance with various embodiments of the present disclosure.

Disclosed herein are various examples related to machines utilizing heavy rare earth (HRE) free permanent magnets. Because of the drawbacks of HRE permanent magnets (PMs), a goal of electric machine designers is to reduce or completely remove those HRE materials from the PMs without degrading system performance. The electric drivetrain cost can be significantly reduced by using HRE-free PMs. HRE materials are difficult to work with because of their extremely high price and lack of stable supply. Even though HRE-free magnets can reduce system cost, these magnets are extremely vulnerable to the demagnetization field, especially at an elevated temperature. Therefore, this problem may be overcome through magnet pole design innovations, magnet cavity design, reduction of magnet eddy current loss or by limiting the magnet's temperature below a safe limit.

To improve the demagnetization performance during elevated temperature two concepts can be adopted: (i) a hybrid rotor concept comprising a segmented magnet with a combination of HRE-free and HRE magnet sections, and (ii) an HRE-free rotor concept.

The hybrid rotor concept uses a combination of HRE and HRE-free PMs. To adopt this concept, each magnet can be segmented into several pieces. The top segments of the edges of a rectangular PM are HRE magnets. The remaining magnets are HRE-free. All the segments can be glued together to make a single piece. The end segments can be be thicker than the middle section of a permanent magnet, or may be the same thickness (or width). The proposed concept can reduce the HRE content by more than 90% without degrading machine performance. It can also ensure that the magnets will not go in the irreversible demagnetization state.

In the cavity, the magnet can be displaced by a distance (x) from the start of the cavity in the rotor. The magnet can be segmented into several pieces, and the magnet piece close to d-axis can be thicker than other segments. Along the magnet width, close to the corner bridges, magnet thickness can be reduced or the thickness can be the same. Different magnet thickness can be used to protect the HRE-free magnet from demagnetization. Moreover, air barriers can be placed close to the top edges.

In this disclosure, a regular interior permanent magnet (IPM) machine using HRE-free PM material is presented and the demagnetization performance investigated under different operating conditions for a 100 kW traction machine. Vulnerable demagnetization regions are identified to improve the irreversible demagnetization performance. A hybrid rotor concept (a combination of HRE and HRE-free PMs) is proposed based on the analysis to improve the irreversible demagnetization performance for different operating modes at an elevated temperature of 150° C. To adopt this hybrid concept, each magnet is segmented into several pieces. Optimization of the shape and thickness of each segment and manufacturing issues are discussed as well. The superiority of the proposed hybrid concept in terms of demagnetization performance is demonstrated using 2-D finite element analysis (FEA). Additionally, the electromagnetic (EM) performance and magnet loss are compared between the proposed hybrid concept and regular design to show the effectiveness of the hybrid rotor concept. Reference will now be made in detail to the description of the embodiments as illustrated in the drawings, wherein like reference numbers indicate like parts throughout the several views.

Demagnetization Analysis of HRE-Free IPM Machines

A regular IPM machine with HRE-free PM material (NEOREC45mhf) was considered to analyze the demagnetization performance. A three-phase distributed winding IPM machine with a 72-slot stator, and 12-pole rotor and V-shape magnet configuration was considered following the industry trend (BMW I3). FIG. 1A shows an example of a finite element analysis (FEA) model of Design-1 of the IPM machine. The specifications of the Design-1 including target power rating, outer diameter, and active length were selected as set by DoE US drive 2025 research goal of 50 kW/liter and are presented in the table of FIG. 1B.

Figure 2A:
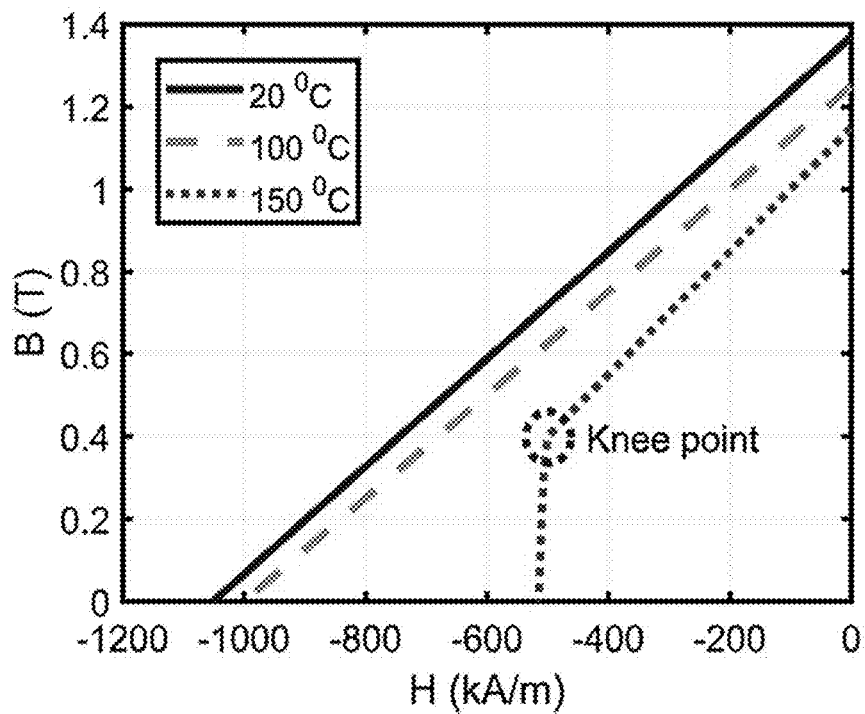
FIGS. 2A-2B illustrate examples of characteristics of a heavy rare earth (HRE) free magnet and an HRE magnet, and performance of an HRE-free machine, in accordance with various embodiments of the present disclosure.
Figure 2B:
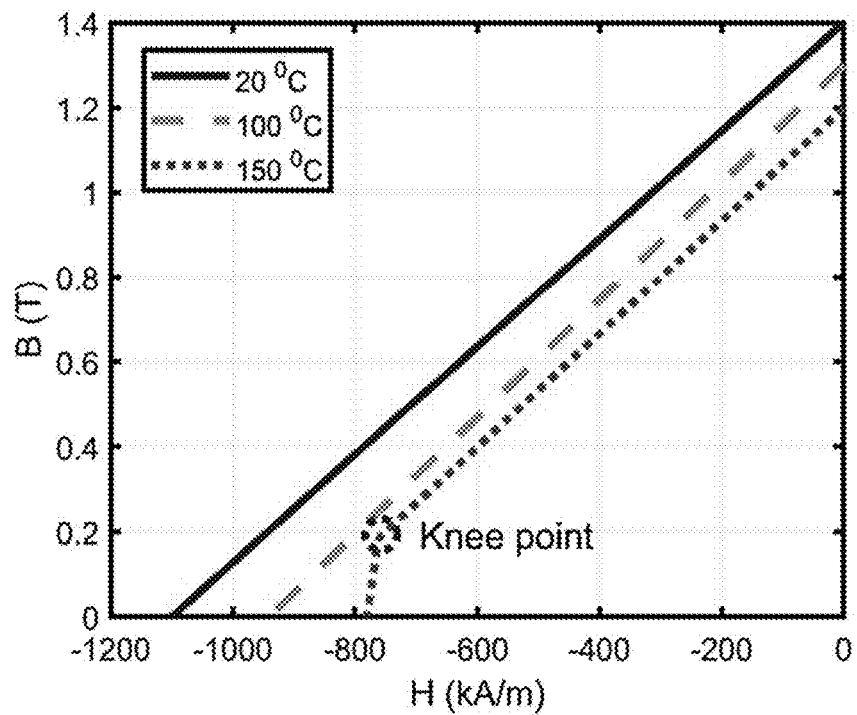

Referring to FIGS. 2A and 2B, shown are the characteristics of the HRE-free magnet and HRE magnet, respectively. From the characteristics of the HRE-free PM in FIG. 2A, it is visible that irreversible demagnetization or knee point flux density increases as the temperature increases. The knee point of this HRE-free PM is 0.4 T at 150° C. In comparison, FIG. 2B shows the characteristics curve of the HRE magnet (G48UH). In this case, the knee point is at a lower flux density of 0.2 T at 150° C. for HRE magnets. Generally, rotor losses as well as magnet losses increase the magnet's temperature and subsequently degrade the demagnetization performance. Typically, the maximum allowable rotor temperature for traction applications is in the range of 140° C.-150° C.

Figure 2C:
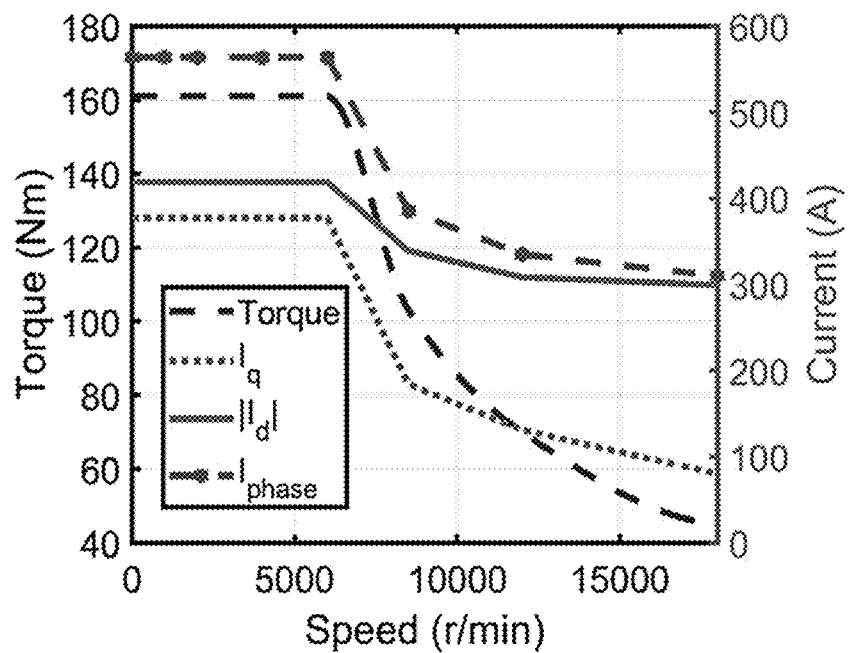
FIG. 2C illustrates an example of torque/speed characteristics of an HRE-free based machine, in accordance with various embodiments of the present disclosure.

A one-sixth 2D-FEA model of the motor is shown in FIG. 1A. This motor is optimized to maximize average torque within the target constraints and specifications as presented in the table in FIG. 1B. The optimization objectives are given by:

$$\max(T), \min(TR) = f(MW, MT, MA, TW), MV \leq 1 \ p.u., J \leq 28, \quad (1)$$

where T, TR, MW, MT (or $M_{THETA}$), MA, TW, MV, J are torque, torque-ripple, magnet width, magnet thickness, magnet angle, teeth width, magnet volume, and current density (A/mm²), respectively. Corresponding torque-speed profile and current-speed profile of the optimized design are presented in FIG. 2C. It is visible that the optimized 100% HRE-free concept can achieve target performances for a 100 kW PM traction machine.

However, for safe operation of a traction machine, the flux density inside the magnets should be higher than the irreversible demagnetization density (the knee point density) at all operating conditions. Therefore, to check whether flux density of an HRE-free PM is going below the knee point or not, the following three conditions are evaluated:

Condition-I: Operating at maximum speed at 150° C.
Condition-II: Demagnetization condition during $I_{phase} = I_{max}$, $\gamma = 90°$, at 150° C. All the available current in the d-axis.
Condition-III: During three-phase short circuit fault at maximum speed.

The above conditions are selected to cover all the worst-case operating scenarios. If any portion of a magnet is not going into irreversible demagnetization under the above-mentioned circumstances, then it can be considered that magnets will be safe in all operating conditions for a traction application. Condition-I is selected to check demagnetization during normal operating situation, and Condition-II and Condition-III are selected to analyze the demagnetization during the worst possible situation. Moreover, three lines (L-I, L-II, and L-III) in FIG. 1A inside the magnet are given special attention during demagnetization analysis because the edges of a magnet are the most susceptible to demagnetization.

Figure 3A:
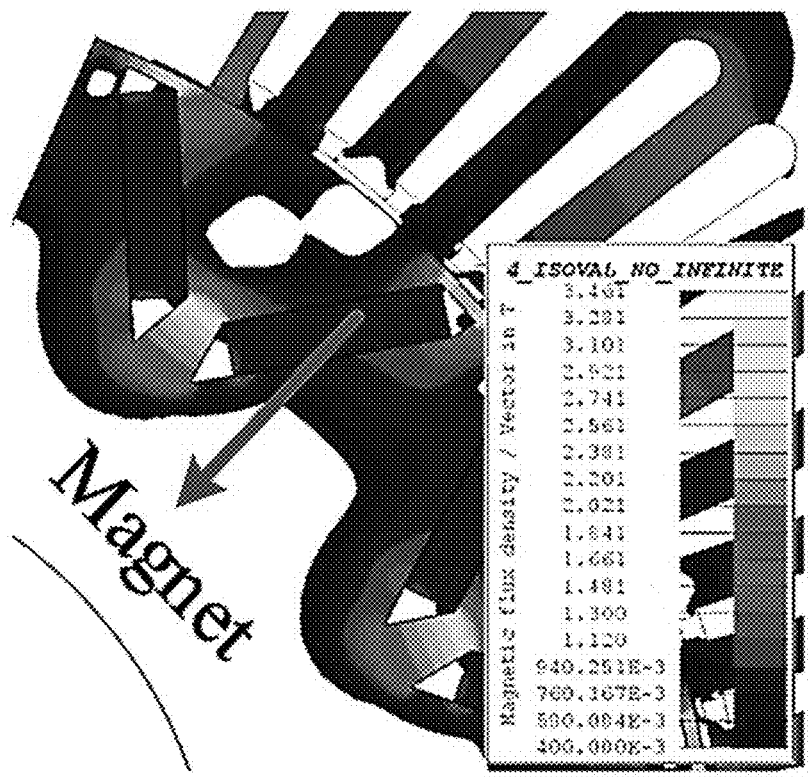
FIGS. 3A-3F illustrate examples of flux density distribution and normal flux density inside the HRE-free machine, in accordance with various embodiments of the present disclosure.
Figure 3B:
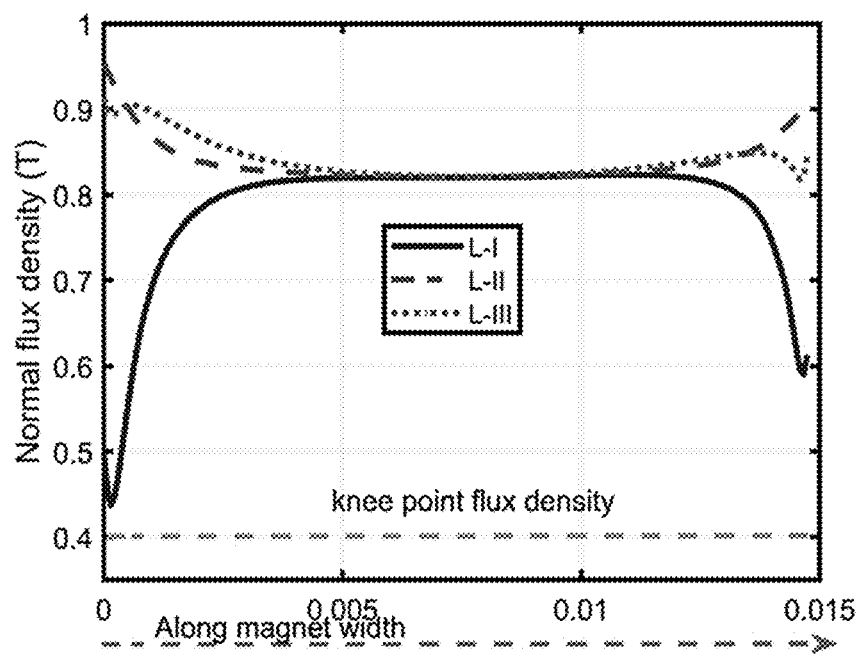
Figure 3C:
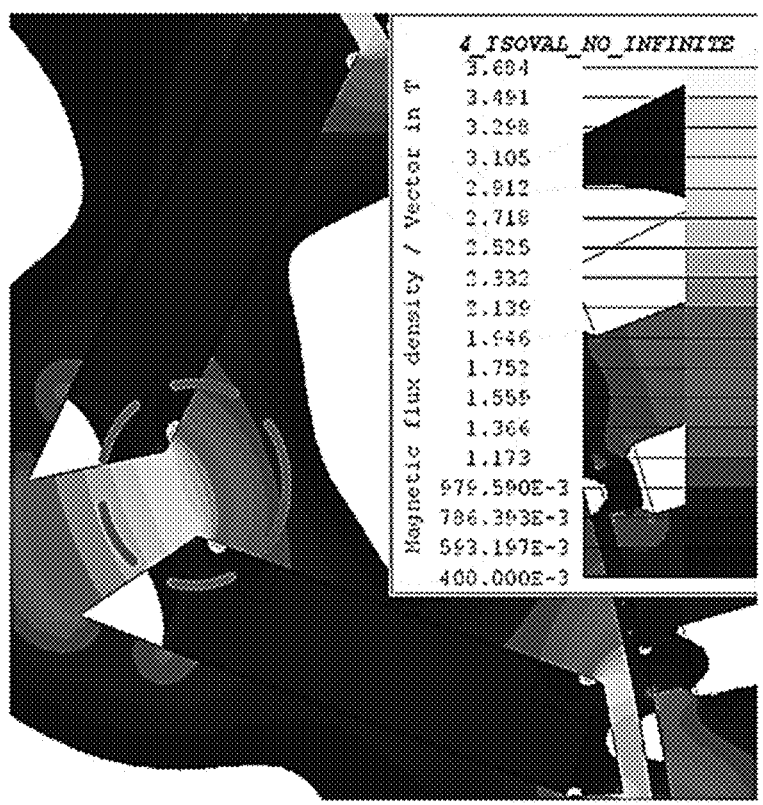
Figure 3D:
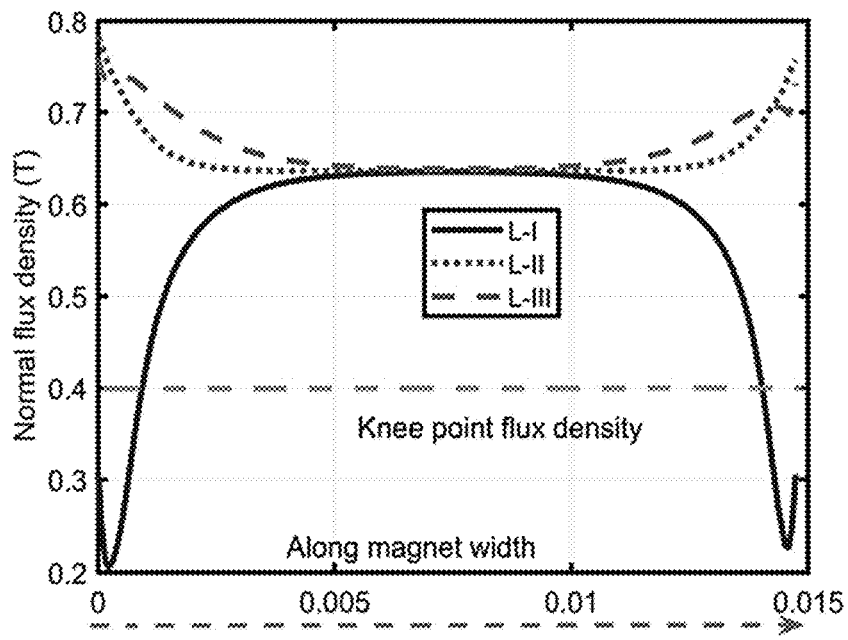
Figure 3E:
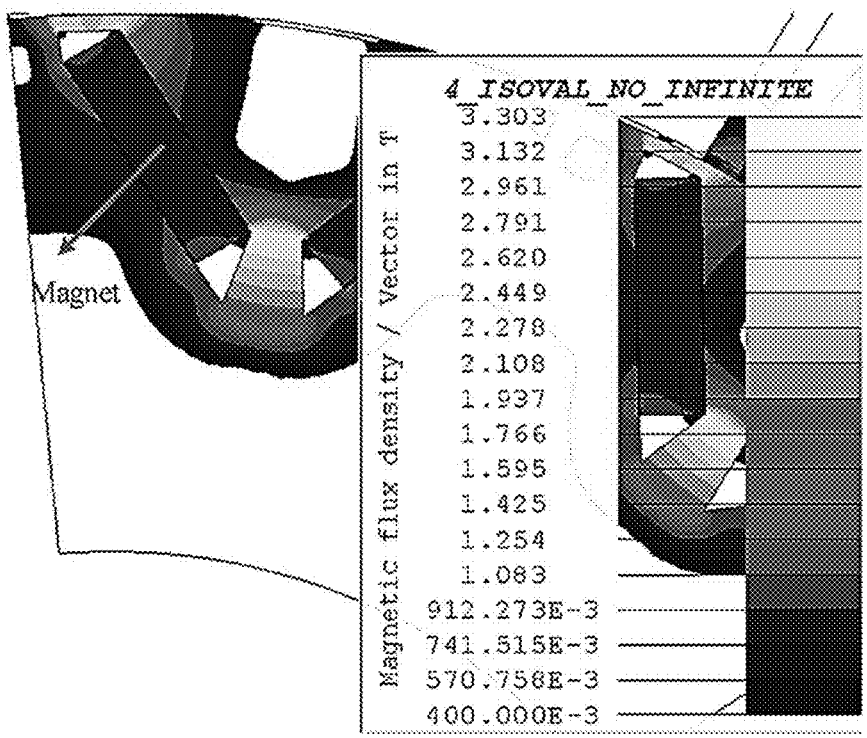
Figure 3F:
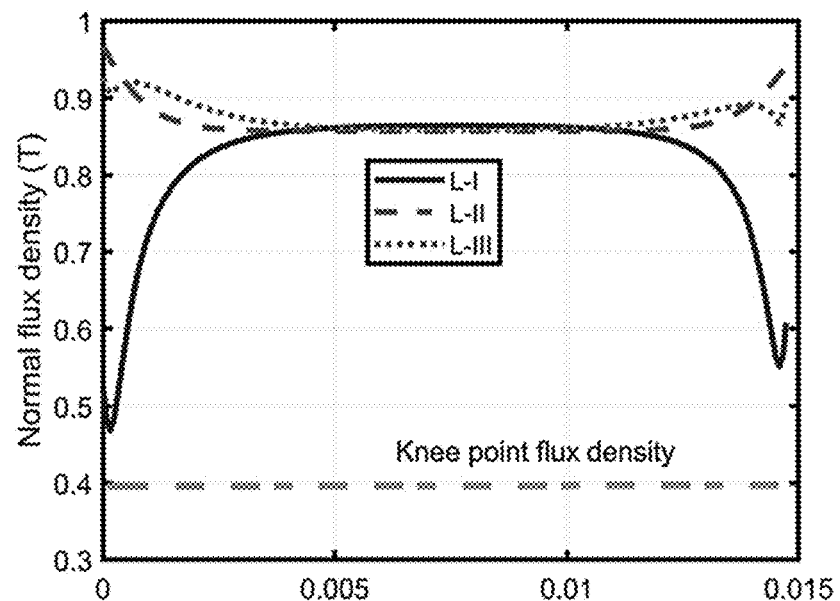

The flux density distribution inside the optimized HRE-free machine for the above mentioned three conditions are presented in FIGS. 3A (Condition-I), 3C (Condition-II) and 3E (Condition-III). Moreover, the flux density in the direction of magnetization (the normal component) along the edge, center and edge lines L-I, L-II and L-III are shown in FIGS. 3B (Condition-I), 3D (Condition-II) and 3F (Condition-III) to check the demagnetization condition of the magnet. It was found that the minimum flux density is at the edges of the magnet, which means edges are more prone to irreversible demagnetization. Even though the demagnetization region is small at the worst-case scenario (condition-III), this area will enlarge and accelerate the demagnetization of the whole magnet with time. Consequently, the performance (torque and efficiency) will be poor. Hence, to utilize the HRE-free PM material in traction applications, the edges of the HRE-free magnets should be protected against the demagnetization field.

Hybrid Rotor: Combination of HRE-Free and HRE Magnets

In the previous section, it was demonstrated that the edges of the HRE-free PM machines are going into the irreversible demagnetization state with 100% negative d-axis current at 150° C. The edges suffer from maximum demagnetizing field. Therefore, a hybrid rotor is proposed where the edges of the rectangular magnet (close to the center bridge and corner bridge) are thicker compared to that at the mid-region to provide a higher permeance coefficient for the edges and to protect the edges from irreversible demagnetization. Generally, magnets in IPM machines have rectangular shapes.

Figure 4A:
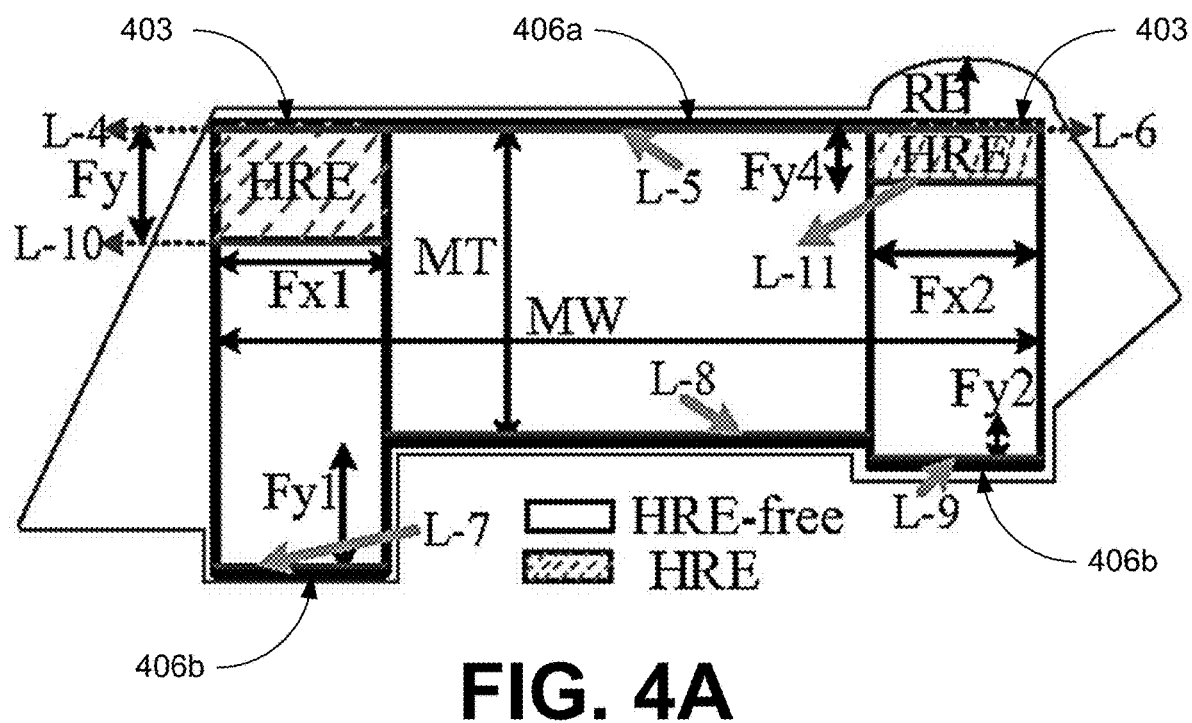
FIGS. 4A-4C illustrate an example of a segmented magnet design used in a hybrid PM machine, in accordance with various embodiments of the present disclosure.
Figure 4B:
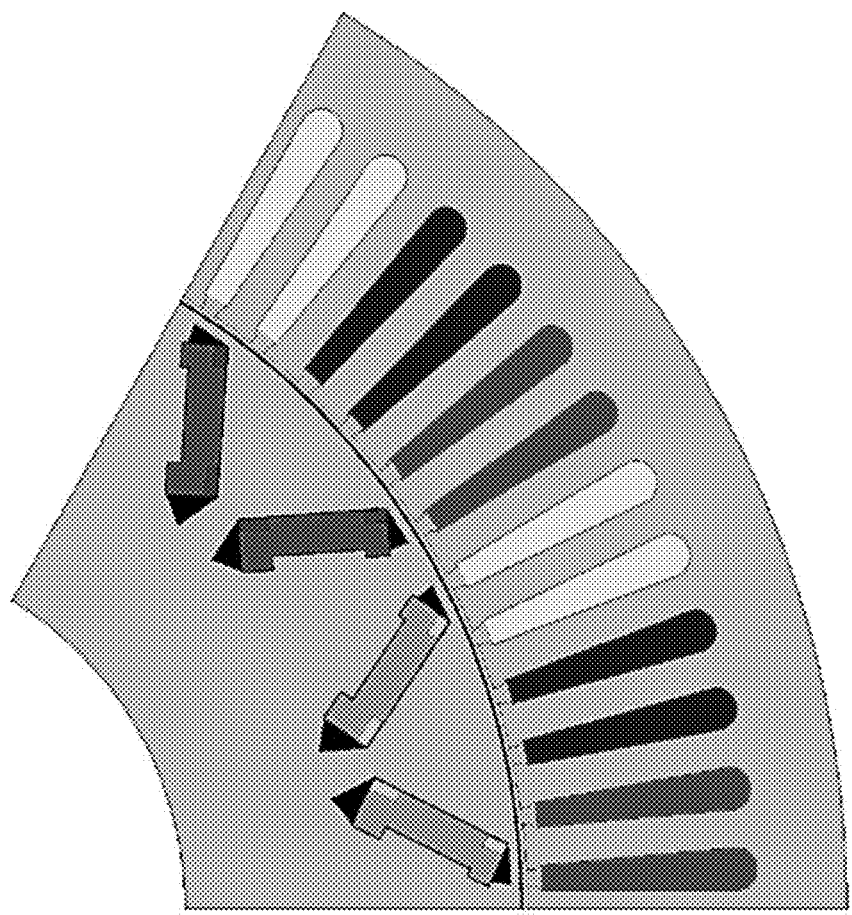
Figure 4C:
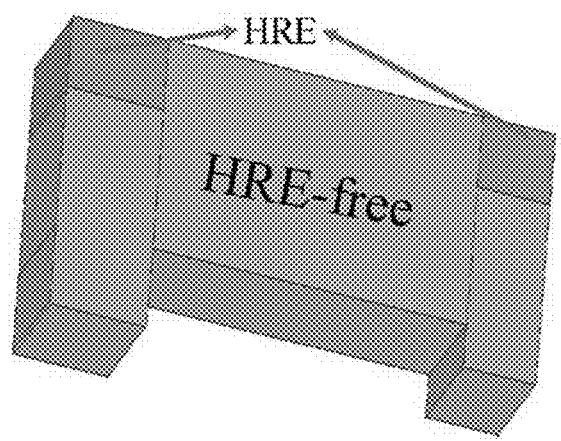
Figure 4D:
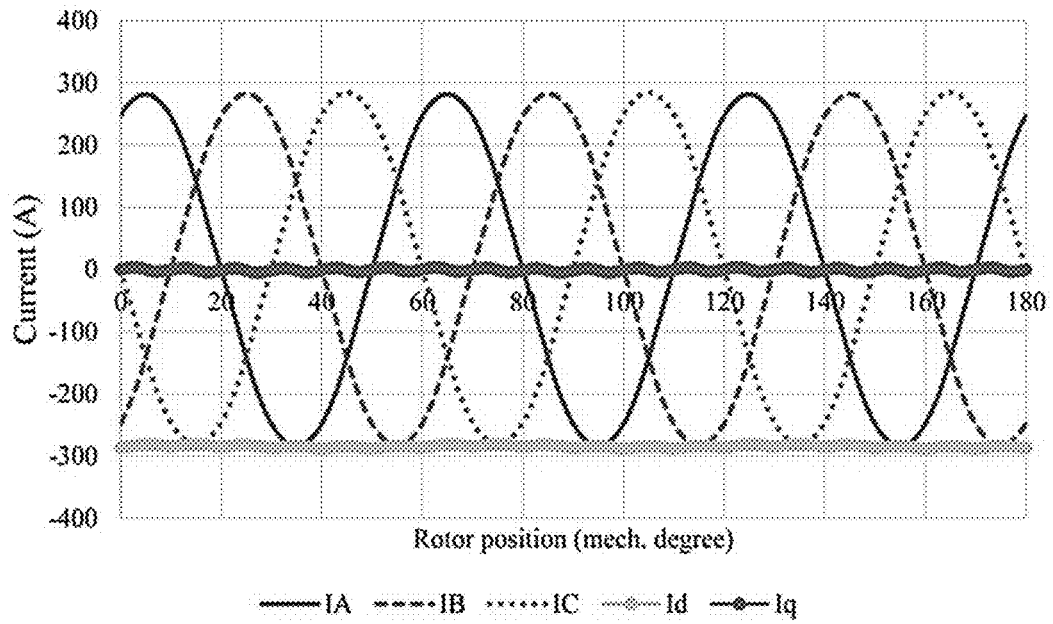
FIG. 4D illustrates an example of three-phase short circuit current of the hybrid PM machine of FIGS. 4A-4C, in accordance with various embodiments of the present disclosure.

To adopt the proposed hybrid rotor concept, each magnet will be segmented into several segments and subsequently glued together to create a single magnet so that it can be easily inserted into the magnet cavity. The hybrid rotor concept will not complicate the manufacturing process because the gluing of different magnet segments is already an established technique. FIG. 4A provides a detailed illustration of an example of a segmented magnet design. The segments 403 at the top corners are HRE magnets since these magnets are less demagnetization prone (having a higher Hc), and has better demagnetization withstand capability. The remaining segments 406 will be HRE-free magnets. The magnet segments 406a close to the center bridge (d-axis) can be thicker than the magnet segments 406b near the corner bridge. However, the physical limitation of using thicker magnets at corner bridges is that it will reduce the q-axis inductance, and subsequently reduce the average torque of the machine. The dimensions of the magnets are shown in FIG. 4A. FIG. 4B shows a one-sixth FEA model of the proposed concept with the segmented magnet in the rotor slots and FIG. 4C is a 3D perspective view illustrating a single segmented magnet of FIG. 4A. As seen in FIG. 4B, adjacent magnets are oriented in opposite directions. FIG. 4D shows an example of the three-phase short circuit current at 18,000 r/min.

Dimensions of the HRE and HRE-free magnets can be determined through optimization so that even at the worst-case scenario ($I_{phase} = I_{max}, \gamma = 90°$), the flux density of all the nodes inside the magnets are above the knee point with a minimum reduction of average torque. The objective function and constraints are shown below:

$$\text{Max}(B)_{L4-L11} = f(Fx1, Fx2, Fy, Fy3, Fy1, Fy2, Fy, Fy4, PANG, RB), \text{Min}(B)_{L4-L11} \geq 0.4T, \quad (2)$$

and the definition of the individual parameters are shown in FIG. 4A. Dimensions L-4 to L-11 are selected to cover all the edges of the proposed hybrid rotor.

Figure 5A:
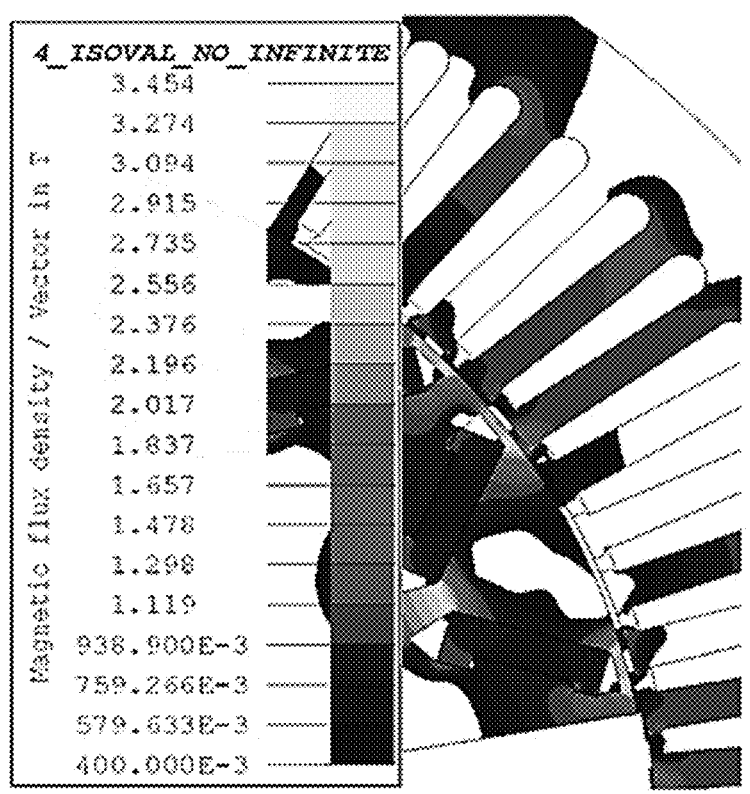
FIGS. 5A-5F illustrate examples of flux density distribution and normal flux density inside the hybrid PM machine, in accordance with various embodiments of the present disclosure.
Figure 5B:
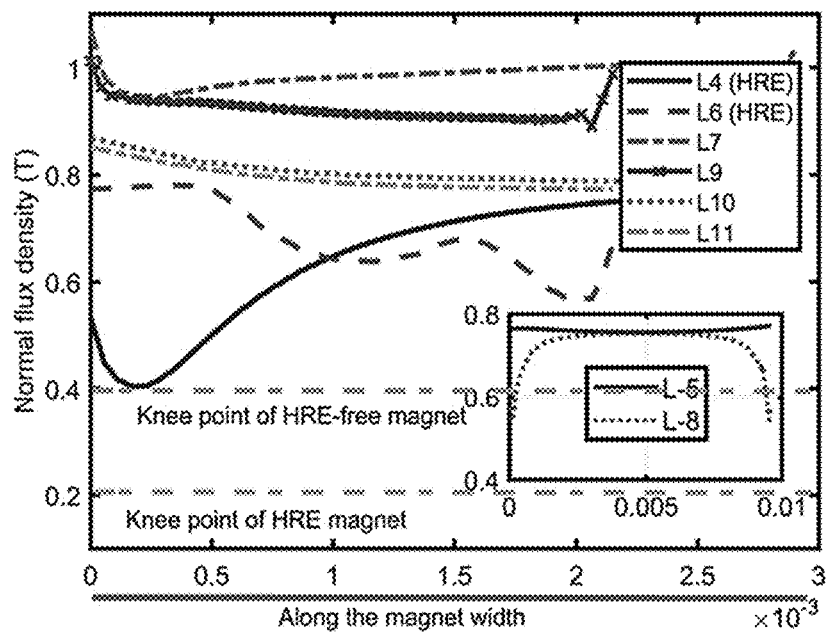
Figure 5C:
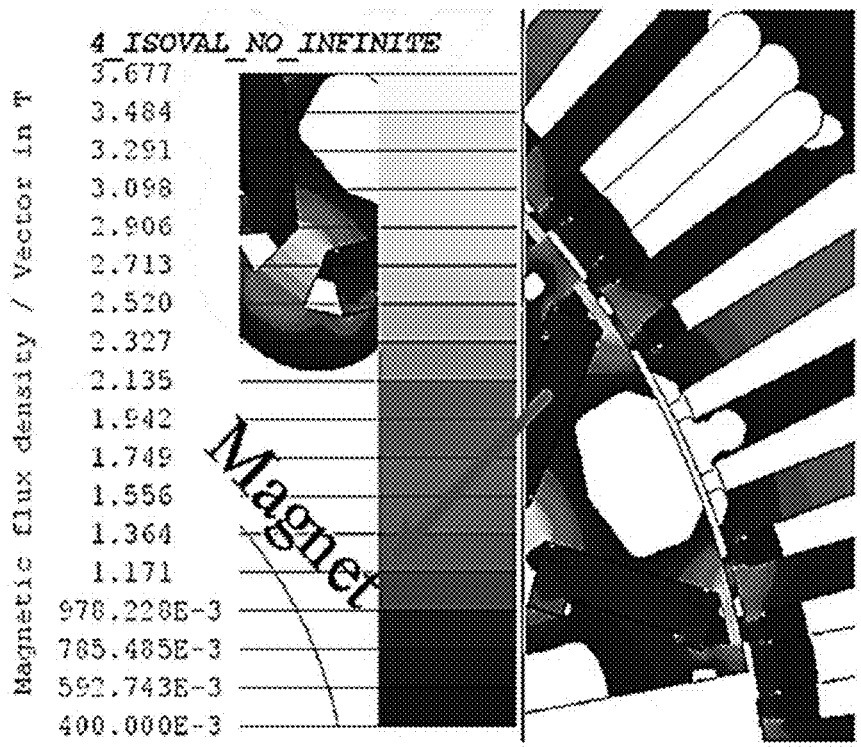
Figure 5D:
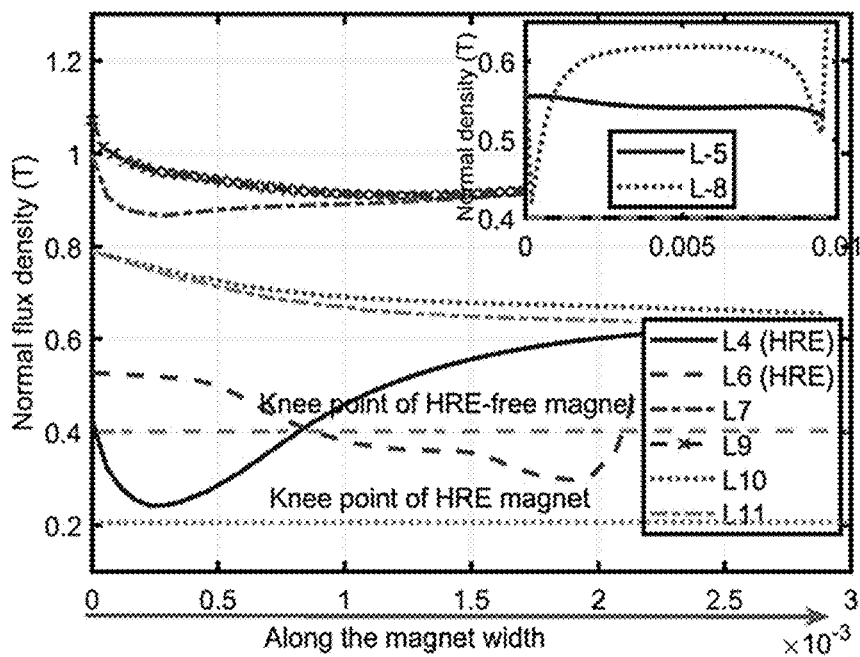
Figure 5E:
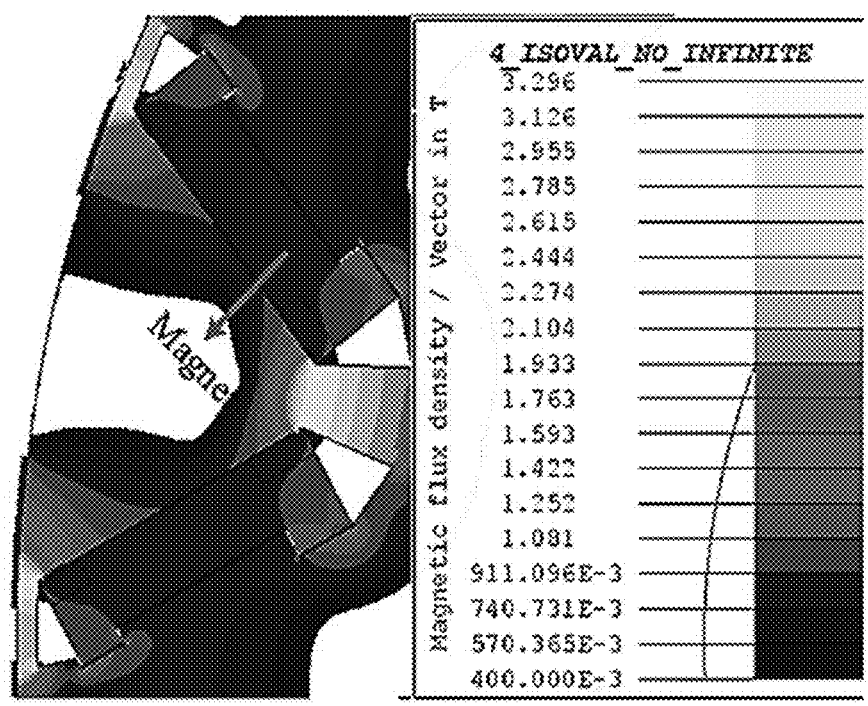

FIGS. 5A, 5C and 5E show examples of the flux density distribution inside the machine using the hybrid concept with the segmented magnets (90% HRE-free) for Condition-I, Condition-II and Condition-III, respectively. The normal flux density along dimensions L-4 to L-11 are illustrated in FIGS. 5B (Condition-I), 5D (Condition-II) and 5F (Condition-III). The magnet flux density distribution inside the magnets are shown in FIG. 5C for condition-II. It is visible that for the optimum dimensions of the HRE and HRE-free magnets, all the PM nodes are above the knee point flux density. The corresponding normal flux density along the L-4 to L-11 are presented in FIG. 5D. Normal flux density is also above the knee point for all the nodes, which justifies that magnets will be safe even when all the available current is against the magnet at 150° C.

Figure 5F:
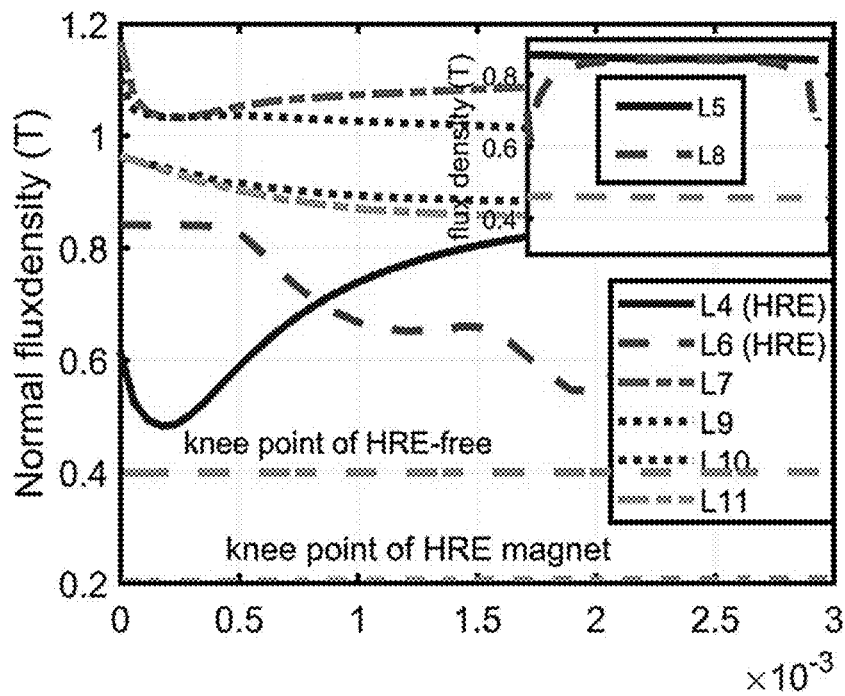

The three-phase short circuit current at maximum speed is presented in FIG. 4D. The flux density distribution and normal flux density plot for those lines in this condition (Condition-III) are shown in FIGS. 5E and 5F, respectively. The flux density for all the PM nodes is above the irreversible demagnetization point which means that the magnets are safe from demagnetization even under three-phase short circuit condition.

The magnet's flux density during Condition-I is presented in FIGS. 5A and 5B. The magnet's operating flux density is above the critical irreversible limit. Therefore, from the above results, it can be said that the proposed hybrid rotor concept can operate up to 150° C. without going into the irreversible demagnetization state. This thermal limit is achieved using a total HRE-free magnet content of 90% compared to 100%. However, if the shape of the air barriers are added for the 100% HRE-free design, even though it improves the demagnetization performance, the machine will still suffer from demagnetization issue as shown in FIGS. 7A and 7B. This presents the importance of the proposed hybrid configuration.

Figure 6A:
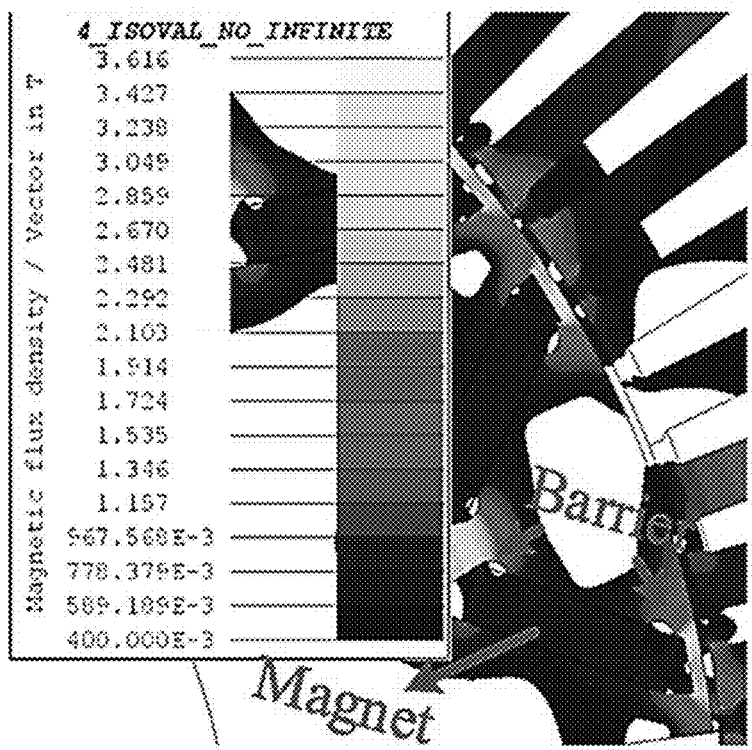
FIGS. 6A-6D illustrate examples of the flux density distribution and normal flux-density of an 100% HRE-free design with air barrier and 100% HRE design, in accordance with various embodiments of the present disclosure.
Figure 6B:
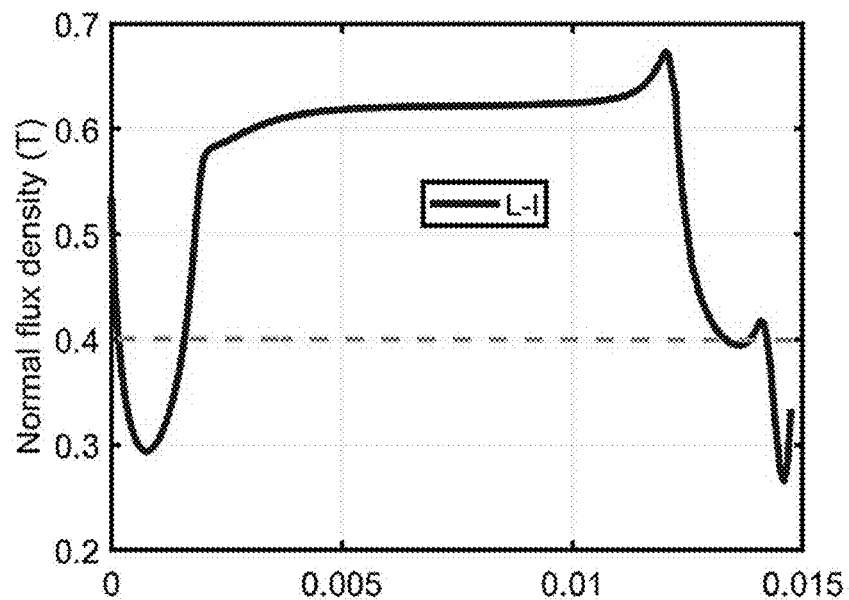
Figure 6C:
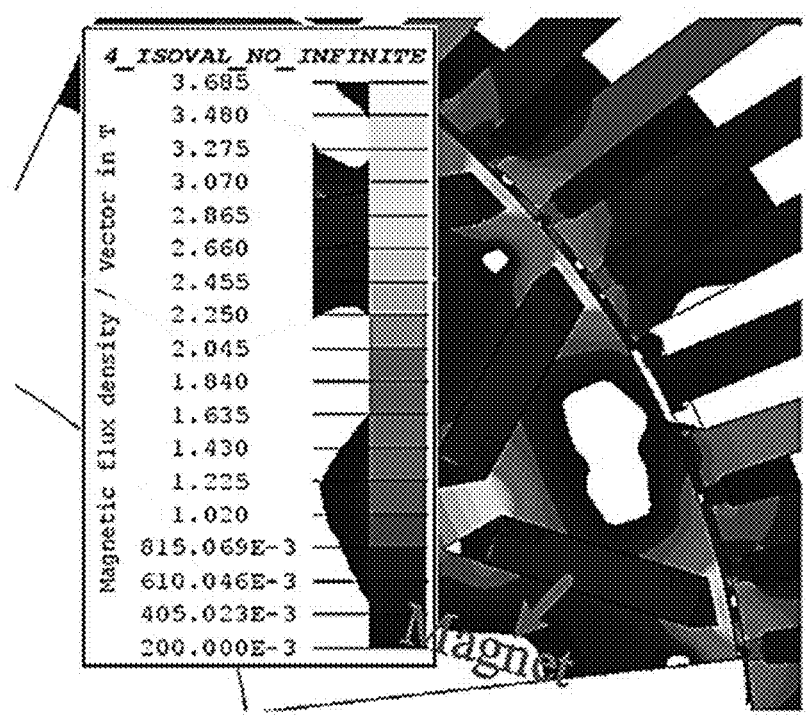
Figures 6D, 7:
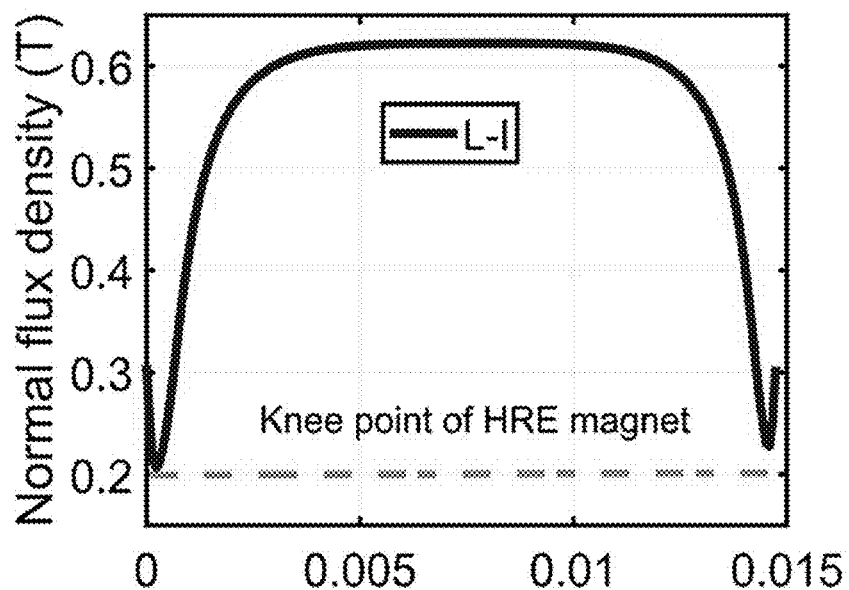
FIG. 7 is a table illustrating the electromagnetic performance of the hybrid PM machine, in accordance with various embodiments of the present disclosure.

FIGS. 6A and 6B illustrate examples of the flux density distribution and the normal flux-density of 100% HRE-free design with air barrier at Condition-II, and FIGS. 6C and 6D illustrate examples of the flux density distribution and the normal flux-density of 100% HRE design. As seen by the demagnetization performance at condition-II for a full-HRE (G48UH) machine presented in FIGS. 6C and 6D, it is worth mentioning that the dimensions for this machine is same as Design-I. It is visible that full-HRE PM machine is also safe at 150° C.

Additionally, due to the segmentation of each magnet in the hybrid rotor, the total eddy current path will be smaller and consequently, magnet loss will be lower compared to that of the regular design. The proposed hybrid concept has a 65% improvement in magnet loss, which helps further to reduce the magnet temperature. Hence, it will improve the demagnetization performance furthermore. Magnet loss is extracted using the 2D-FEA method and presented in the table of FIG. 7. The summary of the electromagnetic performance of the proposed concept is also presented in the table of FIG. 7. It is visible that the proposed concept can achieve a similar electromagnetic performance compared to the Design-I (100% HRE-free).

Figure 8A:
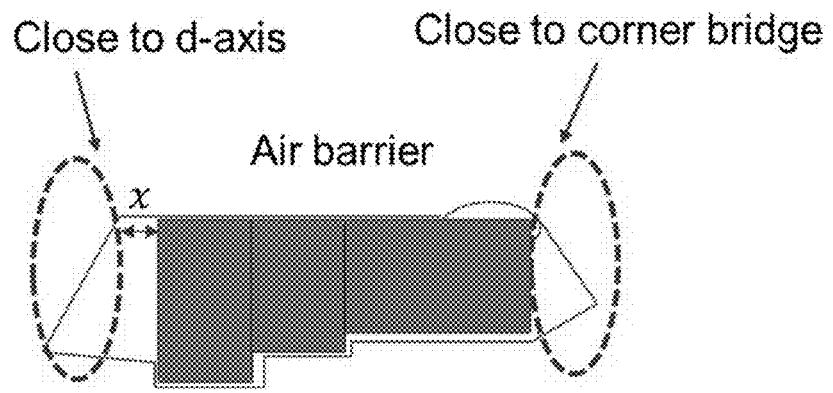
FIGS. 8A and 8B illustrate an example of a segmented magnet design used in an 100% HRE-free PM machine, in accordance with various embodiments of the present disclosure.
Figure 8B:
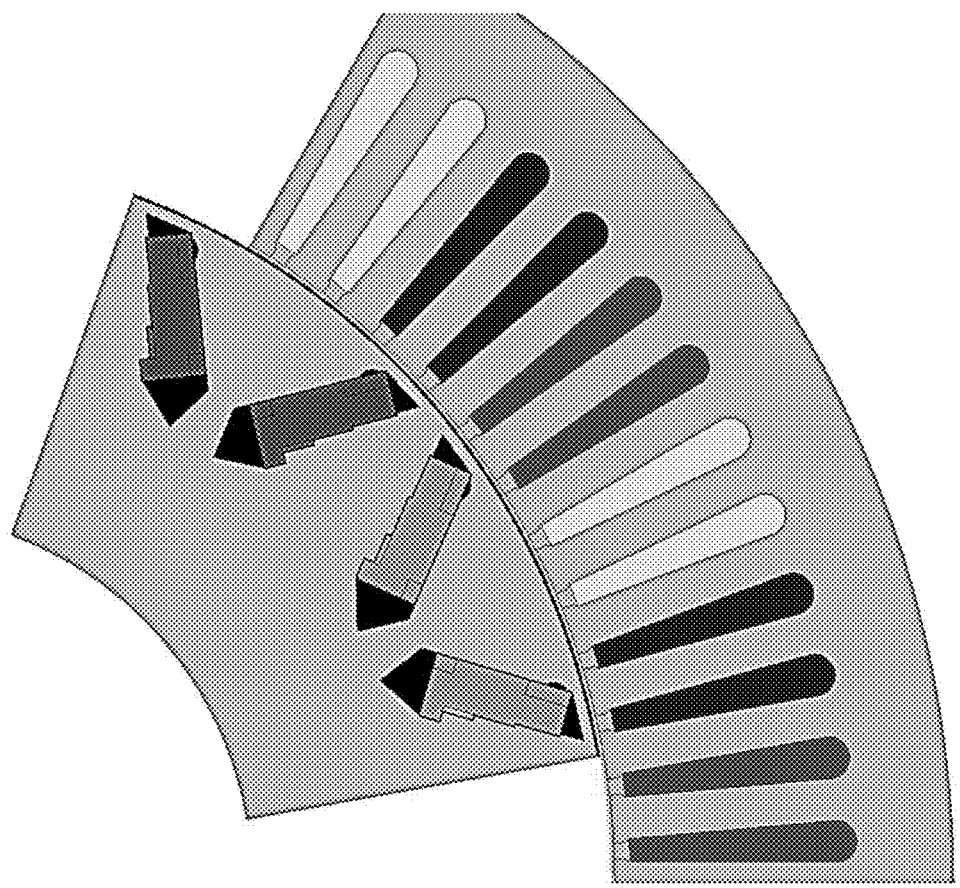
Figure 8C:
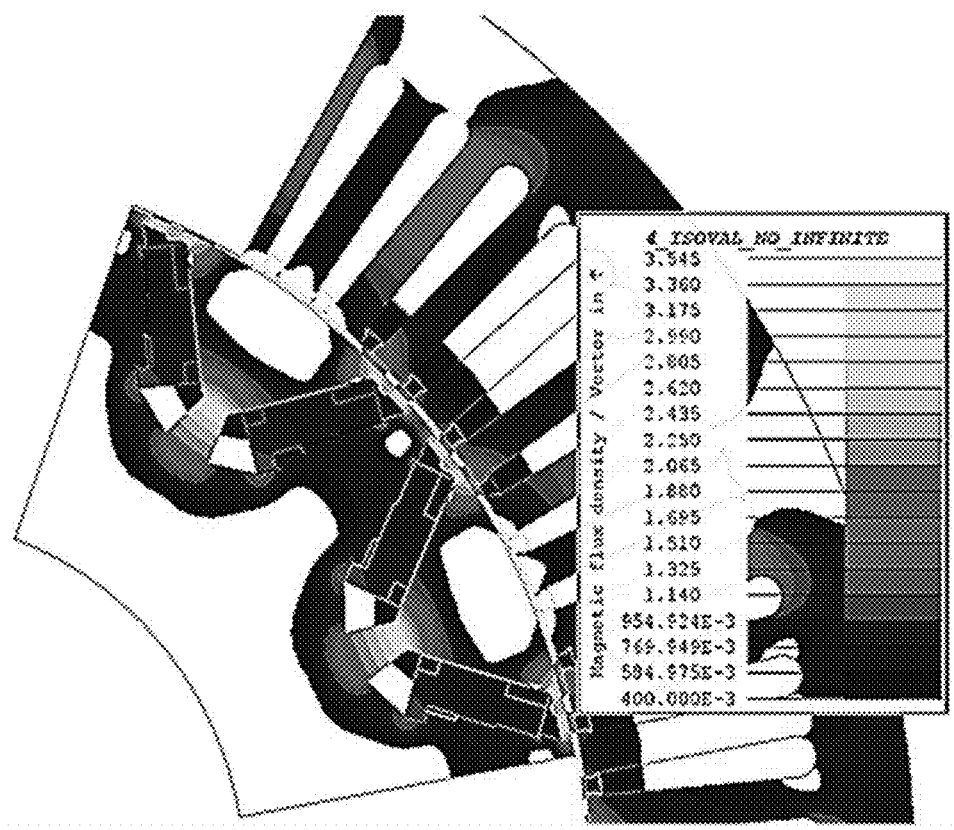
FIG. 8C illustrates an example of the flux density distribution of the 100% HRE-free design of FIGS. 8A and 8B, in accordance with various embodiments of the present disclosure.

FIG. 8A provides a detailed illustration of an example of a segmented magnet design that is 100% HRE-free. The segments are HRE-free magnets. In the rotor slot cavity, the magnet can be displaced by a distance (x) from the start of the cavity (e.g., close to the center bridges or magnet axes) as shown in FIG. 8A. FIG. 8B shows a FEA model of the proposed concept with the segmented magnet in the rotor slots. In this example, the width of the magnet segments decreases from close to the center bridge (d-axis) to near the corner bridge. The magnet segments close to the center bridge (d-axis) can be thicker than the magnet segments near the corner bridge. FIG. 8C illustrates the flux density distribution of the 100% HRE-free design. The magnet flux density is above the knee point even when all the currents are pushed through the negative d-axis ($I_q=0$, $I_d=-I_m$ at 150° C.). The proposed concept allows the HRE-free PM machine to operate up to 150° C.

Figure 9A:
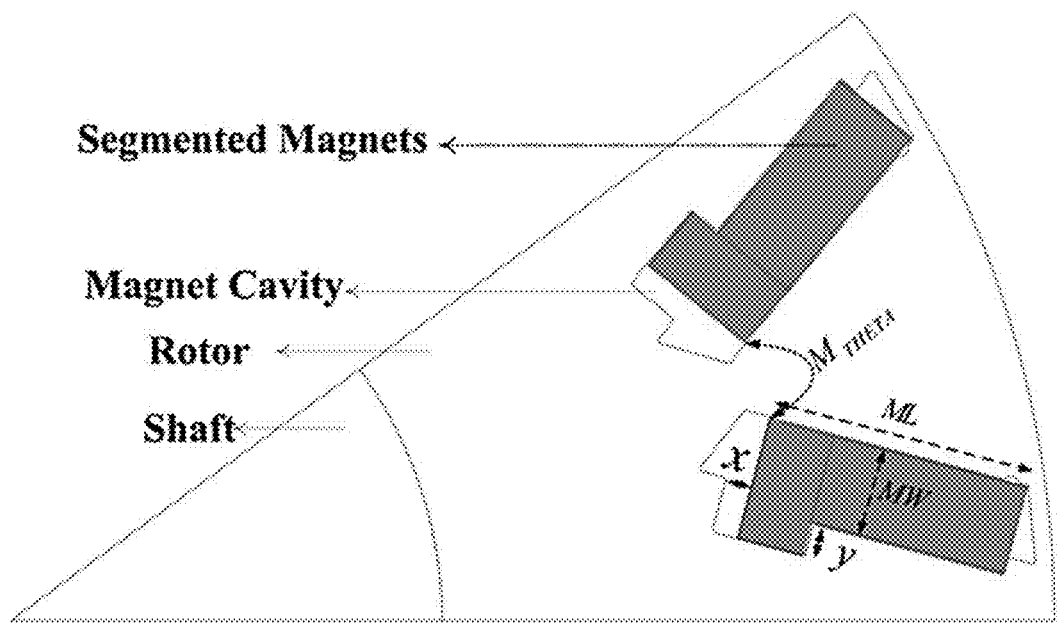
FIGS. 9A and 9B illustrate another example of a segmented magnet design used in an 100% HRE-free PM machine, in accordance with various embodiments of the present disclosure.
Figure 9B:
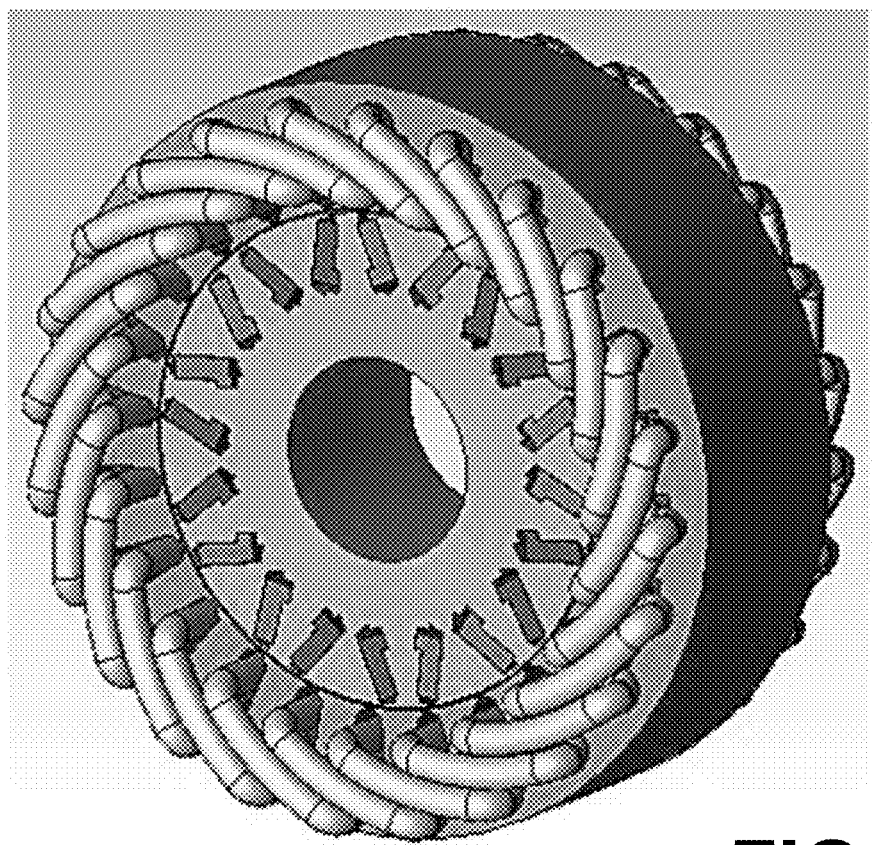

FIGS. 9A and 9B illustrate another example of a segmented magnet design that is 100% HRE-free. FIG. 9A is a cross-sectional view of a single pole of the rotor assembly including a pair of magnets positioned within corresponding rotor slots. The segments of the magnets are HRE-free magnets. An internal permanent magnet (IPM) rotor design with segmented magnets can improve the demagnetization performance of the HRE-free machine. The segmented magnet design can improve the demagnetization performance of the magnets' edges as the edges are more vulnerable to the effects of negative d-axis currents at high temperature. The rotor core can be supported by a rotor shaft extending through the rotational axis of the rotor assembly. FIG. 9B is a perspective view showing the rotor assembly positioned within a stator assembly of the machine. A single conductor is shown for illustration purposes.

As shown in FIG. 9A, the pair of magnets are located within corresponding rotor slot cavities in a mirrored fashion. The magnets have a length (ML) that is less than the length of the rotor slot cavity, with the stack of magnet segments being displaced from the bottom of the cavity by a distance x (e.g., close to the center bridges). The rotor pole retains the V-shape configuration so that the established manufacturing technology can be used, but other orientations are possible. In the example of FIG. 9A, the magnet angle ($M_{THETA}$) is greater than 360°/M, where M is the total number of magnets in the rotor assembly. According to the proposed segmented magnet design of FIG. 9A:

the magnet can be displaced by a distance x from an end of the cavity (close to the center bridges) to improve demagnetization performance at the corners.

the magnet can be segmented into several pieces to reduce eddy current loss and overall temperature (e.g., two or more segments).

the magnet segment closer to the d-axis can be thicker (MW+y) compared to the other segment (MW) as the corners are prone to demagnetization.

Each magnet can be segmented in two pieces to have a rectangular shape to reduce the manufacturing cost. The segmentation of the magnet can not only improve the demagnetization performance, but it can also help to reduce the losses of the magnets. This can help to keep the temperature of the magnets within operating limits.

Figure 9C:
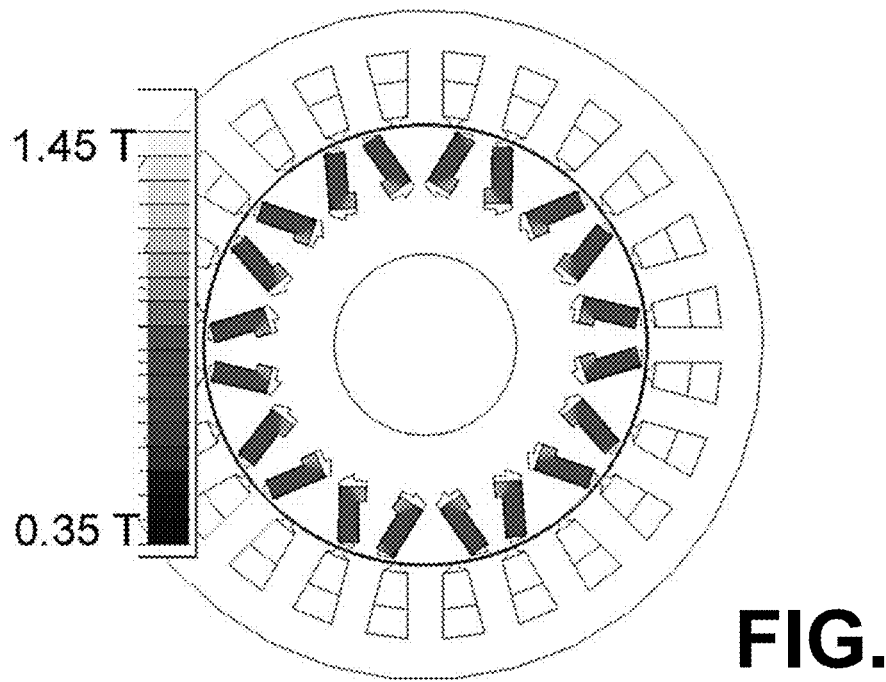
FIGS. 9C-9E illustrate examples of demagnetization performance of the 100% HRE-free design of FIGS. 9A and 9B, in accordance with various embodiments of the present disclosure.
Figure 9D:
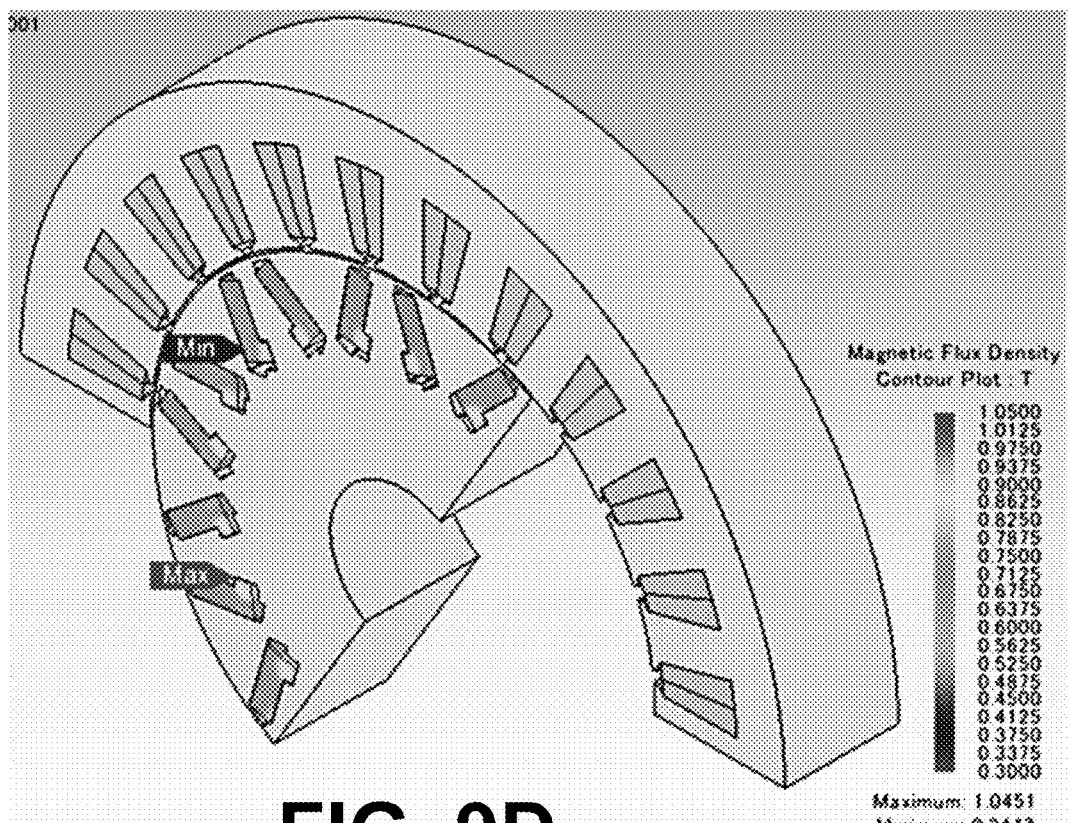
Figure 9E:
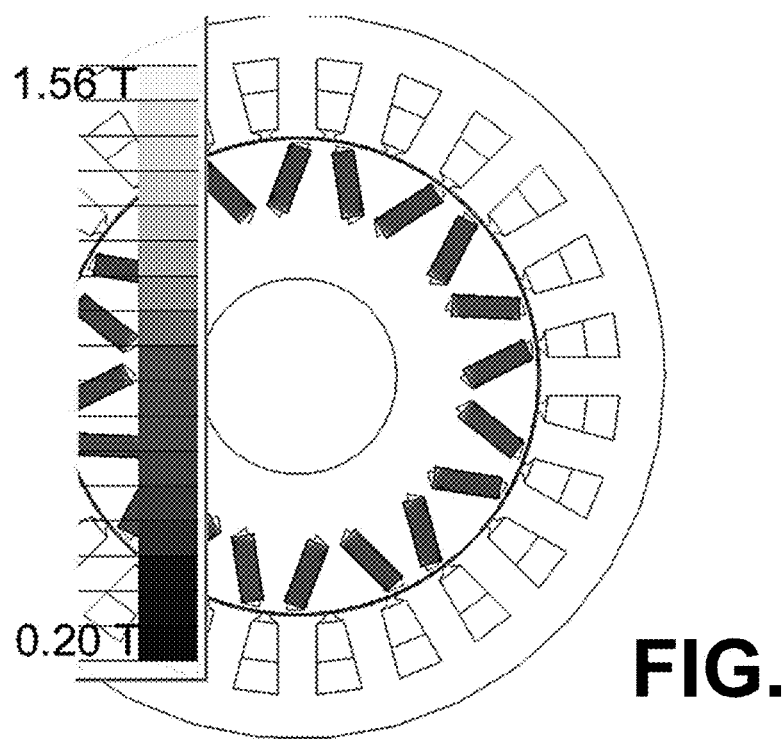

Demagnetization. The demagnetization condition of the design of FIGS. 9A and 9B was checked as the HRE-free magnets' have poor demagnetization capability. The demagnetization performance was checked under the worst conditions; which included: (i) demagnetization performance under the sudden three phase short circuit at the maximum operating speed of 20,000 r/min and (ii) when all the available currents are pushed against the magnets at 140° C. The demagnetization performance under a sudden three-phase short circuit fault at 20,000 r/min is shown in FIG. 9C. The flux density inside the magnet for the first condition using 3D-FEA is presented in FIG. 9D. The minimum flux density is above the knee point of 0.35 T, which ensures the irreversible demagnetization free operation up to 140° C. But the minimum flux density when all the available currents are pushed against the magnets for a conventional V-shape design is 0.20 T, which is lower than the knee point as shown in FIG. 9E.

In this disclosure, the demagnetization performance of a regular IPM machine using HRE-free PM material was investigated and the vulnerable demagnetization regions were identified. It has been found that irrespective of the operating conditions, the edges of the magnets will have the minimum flux density and are more prone towards irreversible demagnetization. A hybrid rotor concept (a combination of HRE and HRE-free PM) was introduced to improve the demagnetization performance. It was found that through proper shaping and optimization of the hybrid rotor concept, the flux density of each node of the magnet up to 150° C. can be maintained above the knee point flux density in all the operating conditions, even when all the available currents are pushed through the negative d-axis. However, the hybrid rotor concept uses 90% HRE-free PM instead of the expected 100%. Additionally, the hybrid concept also reduces the PM losses by more than 65% compared to the regular HRE-free IPM machine due to the segmentation of each magnet, this feature will subsequently improve the demagnetization performance as well.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A permanent magnet (PM) machine, comprising:
    a rotor assembly comprising:
        a rotor core having a plurality of rotor slots, each of the plurality of rotor slots having a cavity length extending from a first end adjacent to a rotor shaft to a second end adjacent to an outer diameter of the rotor core; and
        a plurality of segmented rotor magnets, each of the plurality of segmented rotor magnets positioned within a corresponding rotor slot of the plurality of rotor slots, where at least a portion of each of the plurality of segmented rotor magnets is free of heavy rare earth (HRE) elements, each segmented rotor magnet of the plurality of segmented rotor magnets comprising at least first and second end portions at opposite ends of the segmented rotor magnet and a middle portion separating the first and second end portions, wherein:
            the first end portion includes a first heavy rare earth (HRE) segment, the second end portion includes a second HRE segment, and the middle portion includes at least a first HRE-free segment adjacent to the first and second HRE segments;
            the first end portion comprises a second HRE-free segment adjacent to the first HRE segment and the first HRE-free segment, and the second end portion comprises a third HRE-free segment adjacent to the second HRE segment and the first HRE-free segment;
            a length of each of the plurality of segmented rotor magnets extends along the cavity length of the corresponding rotor slot, the length extending between a side of the first end portion opposite the second end portion and a side of the second end portion opposite the first end portion, and
            the first end portion and the second end portion each have a width substantially perpendicular to the length of the segmented rotor magnet, the width of the first end portion different than the width of the second end portion.

2. The PM machine of claim 1, wherein the widths of the first and second end portions are greater than a width of the middle portion.

3. The PM machine of claim 2, wherein a side of the first and second HRE segments are aligned with a side of the first HRE-free segment.

4. The PM machine of claim 1, wherein the width of the first end portion is greater than a width of the middle portion, and the width of the middle portion is greater than the width of the second end portion.

5. The PM machine of claim 1, wherein the width of the first end portion is greater than the width of the second end portion.

6. The PM machine of claim 1, wherein the rotor assembly is positioned within a stator assembly of the PM machine.

7. A rotor assembly for an electric machine, comprising:
    a rotor core having a plurality of rotor slots, each of the plurality of rotor slots having a cavity length extending from a first end adjacent to a rotor shaft to a second end adjacent to an outer diameter of the rotor core; and
    a plurality of segmented rotor magnets, each of the plurality of segmented rotor magnet positioned within a corresponding magnet cavity of the plurality of rotor slots, where at least a portion of each of the plurality of segmented rotor magnet is free of heavy rare earth (HRE) elements, each segmented rotor magnet of the plurality of segmented rotor magnets comprising at least first and second end portions, wherein:
        the first end portion includes a first heavy rare earth (HRE) segment and a first HRE-free segment, and the second end portion includes a second HRE segment and a second HRE-free segment;
        a length of each of the plurality of segmented rotor magnets extends along the cavity length of the corresponding magnet cavity, the length extending between a side of the first end portion opposite the second end portion and a side of the second end portion opposite the first end portion, and the first end portion and the second end portion each have a width substantially perpendicular to the length of the segmented rotor magnet, the width of the first end portion different than the width of the second end portion.

8. The rotor assembly of claim 7, wherein each of the plurality of segmented rotor magnets comprises a middle portion between the first and second end portions, the middle portion comprising a third HRE-free segment.

9. The rotor assembly of claim 8, wherein the widths of the first and second end portions are greater than a width of the middle portion.

10. The rotor assembly of claim 7, wherein the width of the first end portion is greater than the width of the second end portion.

11. The rotor assembly of claim 10, wherein each of the plurality of segmented rotor magnets comprises a middle portion, a width of the middle portion less than the width of the first end portion and greater than the width of the second end portion.

12. The rotor assembly of claim 7, wherein the each of the plurality of segmented rotor magnets are offset from an end of the rotor slot by a distance.

\* \* \* \* \*